United States Patent Office 3,507,827

Patented Apr. 21, 1970

3,507,827

STABILIZER COMPOSITION FOR LESSENING EARLY DISCOLORATION OF POLYVINYL CHLORIDE RESINS WHEN HEATED

Mark W. Pollock, Teaneck, N.J., assignor to Argus Chemical Corporation, Brooklyn, N.Y., a corporation of Delaware No Drawing. Continuation-in-part of application Ser. No. 417,513, Dec. 10, 1964, which is a continuation-in-part of application Ser. No. 336,887, Jan. 10, 1964. This application Jan. 27, 1967, Ser. No. 612,107

Int. Cl. C08f 45/58

U.S. Cl. 260—45.75 17 Claims

ABSTRACT OF THE DISCLOSURE

A stabilizer combination is provided for decreasing early discoloration of polyvinyl chloride resins when heated at 350° F. and higher, including (1) a dialkyl, dicycloalkyl or alkylcycloalkyl tin mercapto carboxylic acid ester, and (2) an alpha- or beta-mercapto acid having at least three carbon atoms, or an alpha- or beta-mercapto alcohol having at least two carbon atoms. A typical combination is composed of dibutyltin diisooctyl thioglycollate and thiolactic acid.

Polyvinyl chloride resin compositions are also provided containing these stabilizers, and a process for improving the resistance of such resins to the development of early discoloration during the first thirty minutes of heating by incorporating these stabilizers therein.

This application is a continuation-in-part of application Ser. No. 417,513, filed Dec. 10, 1964, and now U.S. Patent No. 3,398,114 which in turn is a continuation-in-part of application Ser. No. 336,887, filed Jan. 10, 1964, and now abandoned.

This invention relates to homogeneous liquid polyvinyl chloride resin stabilizer compositions containing an organotin mercapto acid ester and an alpha- or beta-mercapto alcohol and/or acid, and to polyvinyl chloride resin compositions containing these compounds and having as a result an improved resistance to development of disocloration during heating, and to a process for improving the resistance of polyvinyl chloride resins to early discoloration when heated, using such compounds.

Organotin mercapto acid esters are now recognized as being among the most effective stabilizers for inhibiting the degradation of polyvinyl chloride resins at the high temperatures, e.g. 350° F. or 375° F., to which they are subjected during working. Although these compounds have been successful in providing good stability for one hour or more at 350° F. to 375° F., many of these compounds impart or do not entirely prevent an early yellow discoloration to the resin, which is manifested before severe heat deterioration really sets in. This early discoloration has not been considered disadvantageous for many uses, and the efforts of most workers in this field have been directed towards minimizing the onset of the more serious heat deterioration which sets in during long heating, as in milling. However, because of this discoloration and the accompanying haziness or cloudiness that may also appear, it has not been possible in all cases to obtain a substantially clear and colorless polyvinyl chloride resin composition.

Some organotin compounds can impart, in addition, an initial haziness or cloudiness to the resin. The organotin mercapto acid esters are perhaps less subject to this defect than other organotin compounds, but clarity is also deleteriously affected by other additives. When other additives are present which are themselves responsible for an initial haziness, even these organotin compounds are not capable of alleviating or eliminating the condition. The problem of lack of clarity is especially troublesome with lubricants and impact modifiers, which tend to contribute to this initial lack of clarity, or cloudiness, and also in some cases to the initial discoloration of the resin.

Although early discoloration and any accompanying cloudiness are not nearly so intense as later discoloration and embrittlement arising from heat deterioration of the resin, it has been recognized that the early discoloration arising during the first fifteen to thirty minutes of heating affects a relatively greater proportion of the resin. This is because the average period of time during which a given amount of resin product remains in the processing equipment, even in a continuous process which includes recycling of portions of the worked product, is less than thirty minutes. Only a minor portion of the resin will be subjected to working temperatures for periods of up to one hour or longer. Hence, the preservation of a good color and clarity during the first thirty minutes of heating can be more difficult than the protection of the relatively small proportion of the resin by long term heat stabilizers, such as the organotin mercapto acid esters.

Although the problem of minimizing early discoloration is of long standing, no one has been able to suggest a solution of it.

In fact, there has only been one patent that has suggested a stabilizer combination capable of minimizing initial color and retaining initial clarity along with good long term stability, and this patent is directed to a non-organotin-containing stabilizer combination. U.S. Patent No. 2,997,454, patented Aug. 22, 1961, to Leistner, Hecker and Knoepke, has suggested the combination with heavy metal salts of a higher fatty acid and organic triphosphites, or with such phosphites and polyvalent metal salts of hydrocarbon-substituted phenols, of an acid phosphorus compound having at least one acidic hydrogen atom attached through oxygen to phosphorus. This type of compound is not useful with organotin compounds to minimize early discoloration.

Combinations of various types of additives with organotin compounds have been proposed to improve their heat stabilizing effectiveness, and to impart special effects. For example, U.S. Patent No. 2,914,506 to Mack et al., dated Nov. 24, 1959, suggests combinations of organotin thioglycollates with metallic and non-metallic stabilizers, including metal salts, epoxy compounds, phosphites and phenols. U.S. Patent No. 2,938,013 to Mack et al., dated May 24, 1960, discloses combinations of organotin half ester maleates with other organotin compounds, metal salts, phosphites and epoxy compounds. Lazcano British Patent No. 1,008,589, published Oct. 27, 1965, discloses combinations of organotin half ester maleates and thioglycollates with other metal salts, phenols, epoxy compounds, phosphites, and polyols. None of these combinations is effective both to minimize early discoloration and preserve clarity.

French Patent No. 1,440,654, published Apr. 25, 1966 (the corresponding U.S. application Ser. No. 417,513 of which this application is a continuation-in-part) describes combinations of an organotin moiety, a mercapto acid moiety, and an antioxidant. The organotin moiety can, inter alia, include organotin maleate half esters, and the antioxidants include phenols, thiodipropionates, mono- and polysulfides, phosphites, and aromatic amines.

British Patent No. 1,001,344, published Aug. 18, 1965, describes stabilizer compositions composed of (a) an organo metallic compound in which the metal atom is lithium, sodium, potassium, magnesium, calcium, zinc, strontium, cadmium, barium, aluminum, tin or lead, or a mixture of any two or three of such organic-metallic compounds, provided that the stabilizer does not solely comprise barium laurate or cadmium laurate or dibasic lead phthalate, nor contain a mixture comprising organic-barium, organic-cadmium or organic-tin compounds; (b) a sulfur-containing organic or organo-metallic compound having a boiling point at atmospheric pressure not below 200° C., and that does not contain chains of more than two consecutive sulfur atoms and in which at least one of the sulfur atoms has at least one lone electron pair, excepting mercapto-benzimidazole, mercapto-benzothiazole and their salts; and (c) an organic antioxidant capable of inhibiting chain reactions leading to degradation in the chlorine-containing homopolymer or copolymer. These compositions are not however indicated to improve resistance to early discoloration.

U.S. Patent No. 3,067,166, to Zaremsky, dated Dec. 4, 1962, discloses combinations of zinc or tin salts of organic acids and thioglycollic acid esters. British Patent No. 874,574 to Luz, published Aug. 10, 1961, describes stabilizer compositions composed of an organotin acid salt such as dibutyl tin diacetate and thioglycollic acid ester. These compositions do not lessen early discoloration, because the esters are ineffective in this respect. British Patent No. 771,857 published Apr. 3, 1967, discloses combinations of mercapto acid esters with organotin oxides.

Wooten et al. U.S. Patent No. 3,063,963, issued Nov. 13, 1962, disclose combinations of organotin carboxylates of mono- or dicarboxylic acids with omega mercapto acid esters or omega mercapto alcohols to improve weathering resistance of polyvinyl chloride resins. There is no suggestion that early discoloration is lessened in the combinations that are disclosed.

It has now been found that combinations of an organotin mercapto carboxylic acid ester and an alpha- or beta-mercapto acid having at least three carbon atoms or alpha- or beta-mercapto alcohol having at least two carbon atoms have the unusual property of lessening development of discoloration of polyvinyl chloride resins, particularly during the first thirty minutes of heating at 375° F. These combinations are homogeneous liquids which can be readily measured and mixed into the resin, and are thus easy to formulate, market and use.

In accordance with this invention, there are provided stabilizer compositions for polyvinyl chloride resins comprising (a) at least one organotin mercapto acid ester which has from one to two mercapto carboxylic acid ester groups linked to tin through a mercapto sulfur atom, and two alkyl and/or cycloalkyl groups linked to each tin through carbon, and (b) at least one mercapto compound selected from the group consisting of alpha- and beta-mercapto carboxylic acids having from three up to about thirty carbon atoms and alpha- and beta-mercapto alcohols having from two to about thirty carbon atoms.

The mercapto acid or alcohol (b) alone imparts no stabilizing effect upon polyvinyl chloride resins but in combination with the organotin mercapto acid ester lessens or entirely prevents development of a yellow discoloration during heating at 350° F. The mercapto acid or mercapto alcohol can also reduce any initial cloudiness and discoloration in the resin introduced by the organotin mercapto acid ester and/or stabilizers and additives such as impact-modifiers and lubricants.

The organotin mercapto acid esters can be monomeric or polymeric, but are preferably monomeric. The monomers can be defined as organotin compounds having organic radicals linked to tin only through carbon, sulfur, and oxygen, and having the general formula:

(I) 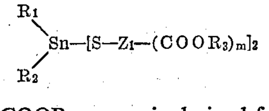

The $S—Z_1—COOR_3$ group is derived from a mercapto carboxylic acid ester.

*m* is the number of $COOR_3$ groups and is an integer from one to four.

$R_3$ is an organic group derived from a monohydric or polyhydric alcohol having from one to about four hydroxyl groups and from about one to about thirty carbon atoms. If there is more than one $COOR_3$ group, the $R_3$ radicals can be the same or different.

$R_1$ and $R_2$ are alkyl or cycloalkyl radicals having from about three to about thirty carbon atoms, preferably from three to seven. $R_1$ and $R_2$ can, for example, be propyl, isopropyl, n-butyl, isobutyl, tert-butyl, amyl, hexyl, octyl, isononyl, monyl, decyl, undecyl 2-ethylhexyl, iso-octyl, lauryl, palmityl, stearyl, myristyl, behenyl, cyclobutyl, cyclohexyl, methyl cyclohexyl and cyclopentyl.

$Z_1$ is a bivalent organic radical carrying the S and $COOR_3$ groups, and in addition can contain halogen, free carboxylic acid groups, keto groups, mercapto groups, carboxylic acid salt groups, ether groups and hydroxyl groups. The $Z_1$ radical has from one to about thirty carbon atoms, such as an alkylene, arylene or cycloalkylene radical.

The $S—Z_1—(COOR_3)_{m3}$ groups are derived from mono- or polymercapto carboxylic acid esters by removal of the hydrogen atom of the mercapto group. These include the esters of aliphatic, aromatic, cycloaliphatic and heterocyclic acids which contain at least one mercapto group, and can also contain inert substituents such as halogen, hydroxyl, keto and alkoxy groups, such as, for example, esters of mercaptoacetic acid, mercaptopropionic acid, mercaptooleic acid, mercaptoricinoleic acid, mercaptolinoleic acid, mercaptostearic acid, mercaptobutyric acid, mercaptovaleric acid, mercaptohexanoic acid, mercaptooctanoic acid, thiolactic acid, mercaptolevulinic acid, mercaptolauric acid, mercaptobehenic acid, dithiotartaric acid, mercaptopalmitic acid, mercaptobenzoic acid, mercaptomethylbenzoic acid, mercaptocyclohexane carboxylic acid, mercaptofuric acid, thiomalic acid, mercaptoglutaric aid, mercaptoaxelaic acid, mercaptomalonic acid, mercaptoadipic acid, mercaptopimelic acid, mercaptosuberic acid, mercaptosebacic acid, and mercaptoterphthalic acid.

$R_3$ is an organic group derived from a monohydric or polyhydric alcohol of the formula $R_4—(OH)_{n4}$ where $n_4$ is an integer from one to about four, but is preferably one or two. Thus, $R_4$ can be alkyl, alkylene, alkylenyl, aryl, arylene, mixed alkyl-aryl, mixed aryl-alkyl, cycloaliphatic and heterocyclic and acn contain from about one to about thirty carbon atoms, and can also contain ester groups, alkoxy groups, hydroxyl groups, halogen atoms and other inert substituents. Preferably, $R_4$ is derived from a monohydric alcohol containing from one to about thirty carbons atoms, such as methyl, ethyl, propyl, n-butyl, t-butyl, isobutyl, octyl, isooctyl, 2-ethylhexyl, decyl, lauryl, octadecyl, myristyl, palmityl, oleyl, dodecyl, isotrodecyl and ricinoleyl alcohols, cyclic monohydric alcohols, such as cyclopropanol, 2,2-dimethyl-1-cyclopropanol, cyclobutanol, 2-phenyl - 1 - cyclobutanol, cyclopentanol, cyclopentenol, cyclohexanol, cyclohexenol, 2-methyl-, 3-methyl-, and 4-methyl-cyclohexanol, 2-phenylcyclohexanol, 3,3,5-trimethyl cyclohexanol, 1,4-cyclohexadiene-3-d, cycloheptanol, cycloheptene-3-d, 1,5 - cycloheptadiene-3-ol, 2-methyl-, 3-methyl- and 4-methyl cycloheptanol, cyclooctanol, cyclooctenol, cyclononanol, cyclodecanol, cyclodecene-3-ol, cyclododecanol, the para-menthanols, such as 3-hydroxy-p-menthane, 2-hydroxy-p-menthane, the para-menthenols such as α-terpineol, borneol, pine oil, fenchol, 2,2-di-methyl-3,6-endo-methylene cyclohexanol, methyl borneol, 2,2,10-trimethyl - 3,6 - endomethylene cyclohexanol, the cyclic sesquiterphenols such as farnesol and nerolidol, the sterols such as cholesterol, dihydrocholesterol, ergosterol, 24-ethyl cholesterol, the condensed alicyclic alcohols such as 1-, and 2-hydroxyl-1, 2,3,4-tetrahydronaphthalene and 1-, and 2-hydroxydecahydronaphthalene, or from a dihydric alcohol such as glycols containing from two to about thirty carbon atoms, including ethylene glycol, propylene glycol, diethylene glycol, dipropylene glycol, tetramethylene glycol, neopentyl glycol and decamethylene glycol, 2′,2′-4-trimethyl pentane-diol, 2,2′,4,4′-tetramethyl cyclobutane-diol, cyclohexane-1,4-dimethylanol, 4,4′-isopropylidene-dicyclohexanol, and polyols such as glycerine, triethylol propane, mannitol, sorbitol, erythritol, dipentaerythritol, pentaerythritol, and trimethylol propane.

These marcapto acid esters, where not known, can be readily prepared by reaction of the mercaptocarboxylic acid esters with the corresponding organotin oxide or chloride. For a more complete explanation of the process for making, and for additional examples of these dis-organotin mercapto ester compounds, see U.S. Patents Nos. 2,648,650 to Weinberg et al., 2,641,596 and 2,752,-325 to Leistner, and 3,115,509 to Mack, and Canadian Patent No. 649,989 to Mack.

The organotin mercapto acid esters containing two different mercapto acid ester groups can be prepared by reacting the desired organotin oxide or chloride with a mixture of the mercapto acid esters, or by heating the two different organotin esters together.

Polymeric organotin mercapto acid esters falling within the present invention are formed of a chain of organotin groups wherein each tin atom is linked to two alkyl and/or cycloalkyl groups. There is at least one mercapto carboxylic acid ester group attached through a sulfur atom to each terminal tin atom of the chain. The linking group between tin atoms of the chain can be any bivalent organic group linked to tin through oxygen or sulfur. One type of such polymeric organotin thioesters can be defined by the formula:

(II)

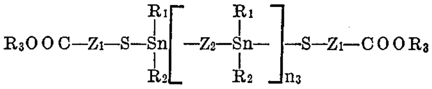

wherein $Z_2$ is a bivalent group, such as oxygen, sulfur, a mercapto acid group, or a mercapto alkanol group, and $n_3$ is a number from one to about twenty.

The $Z_2$ mercapto acid group can have the formula:

$$—S—Z_1—COO—$$

and the $Z_2$ mercaptoalkanol group can have the formula:

$$—S—Z_1—O—$$

The following organotin thioesters are typical of those coming within the invention:

1.

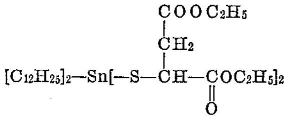

2.

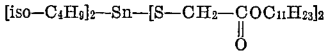

3.

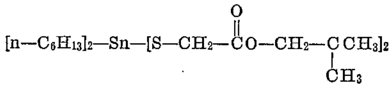

4.

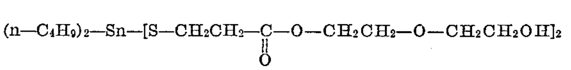

5.

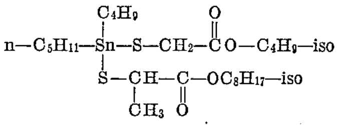

6.

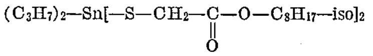

7.

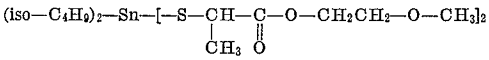

8.

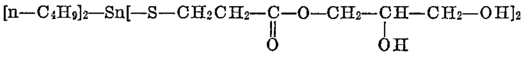

9.

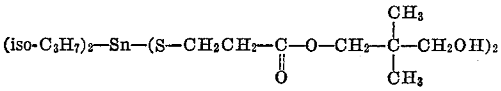

10.

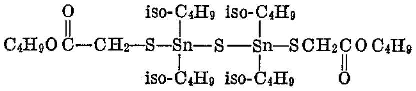

11.

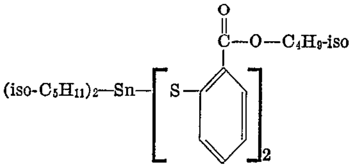

12.

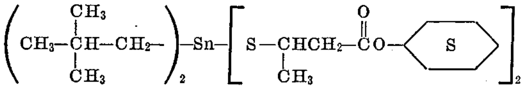

13.

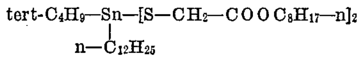

14.

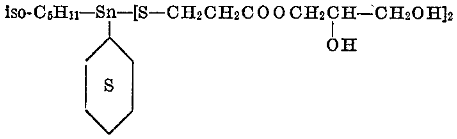

15.

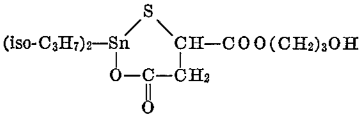

16.

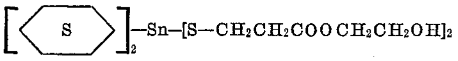

17.

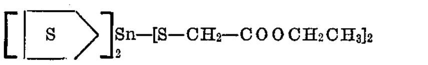

18.

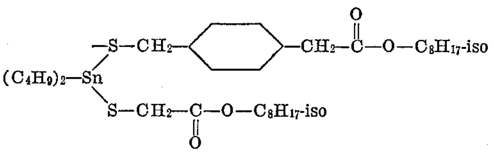

19.

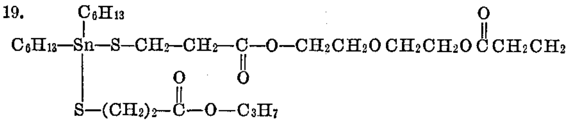

20.

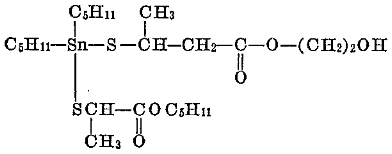

21.

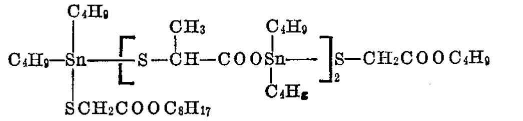

22.

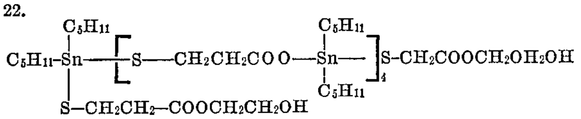

23.

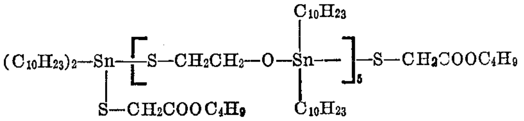

The second component is selected from the group consisting of α- and β-mercapto acids having from three to thirty carbon atoms and α- and β-mercapto alcohols having from two to thirty carbon atoms. The α- and β-mercaptohydroxy acids fall within both classes. These compounds can be defined by the formulae:

(III) 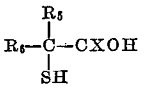 α compounds (IV) 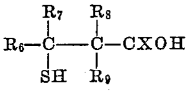 β compounds

X=O or $H_2$ $R_5$=hydrocarbon group when X=O $R_5$, $R_6$, $R_7$, $R_8$ and $R_9$ are hydrogen or a hydrocarbon group, such as alkyl, aryl, or cycloalkyl, alkenyl or cycloalkenyl.

In addition, $R_5$ or $R_6$ or $R_7$ can be hydroxyalkyl. $R_5$ and/or $R_6$ can also be $—CH_2COOH$. In addition, $R_5$ or $R_6$ can be selected from $—(CH_2)_nCOOH$ wherein *n* is four or five, or

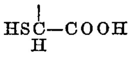

When $R_5$ or $R_6$ is $—(CH_2)_nCOOH$, the other is hydrogen; when $R_5$ or $R_6$ is

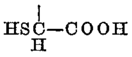

the other is hydrogen. Furthermore, $R_6$, $R_7$, $R_8$ and $R_9$ of Formula IV can be taken together with

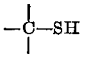

to form a phenyl ring, a naphthyl ring, a cyclohexyl ring or a furfuryl ring, and $R_5$ and $R_6$ of Formula III can be taken together with

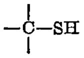

to form a phenyl ring.

The α-mercapto acids are preferred, and the β-mercapto-acids are next preferred. The acids are preferred to the alcohols because of their better odor.

Examples of these mercapto acids include: 3-mercapto-2,3-dimethyl butyric acid, 2-mercaptopropionic acid, 3-mercaptopropionic acid, 2-mercaptobutyric acid, 3-mercaptobutyric acid, 3-mercapto-4-hydroxy butyric acid, 2 - mercapto - 3 - methylbutyric acid, 3-mercapto-4,5-dimethylhexanoic acid, 2 - mercaptostearic acid, 3-mercapto-oleic acid, 2-mercapto-valeric acid, 3-mercapto-hexanoic acid, 2-mercapto-6-hydroxy-hexanoic acid, 3-mercapto-4-ethylhexanoic acid, thiomalic acid, thiocitric acid, dithiotartaric acid, 3-mercaptoglutaric acid, 2-mercapto-pimelic acid, 2-mercaptosuberic acid, thiosalicyclic acid, 2-mercaptocyclohexane carboxylic acid, 3-mercapto-2-naphthoic acid, 3-mercaptofuroic acid, and 2-mercapto-lauric acid, and mixtures of these.

Typical mercapto alcohols include 2-mercaptoethanol, 2-mercapto-1-propanol, 1-mercapto-2-propanol, 3-mercapto - 4,5-dimethylhexanol, 2-mercapto-4-ethylhexanol, 2-mercapto-3-butanol, 3-mercapto-lauryl alcohol, 3-mercapto-4,5-diethyl hexanol, 2-mercapto-oleyl alcohol, 2-mercapto-stearyl alcohol, 2-mercapto-1-butanol, ortho-mercapto-benzyl alcohol, 2-mercaptocyclohexanol, and 3-mercapto-tetrahydrofurfuryl alcohol.

A unique property of these α- and β-mercapto acid and mercapto alcohols is their excellent compatibility with the organotin mercapto acid esters. These compounds are generally miscible throughout the range of proportions used for the invention, and such mixtures are homogeneous liquid solutions. Thus, they can be readily measured and blended into a resin mixture by the resin processor.

In this respect, the α-mercapto acid having two carbon atoms differs; thioglycollic acid is incompatible with organotin mercapto acid esters, and causes precipitation, forming a nonhomogeneous mixture. A nonhomogeneous mixture increases the problems of measuring and mixing the stabilizer into the resin, and practically speaking is unmarketable commercially, because of its dissolute appearance.

The invention is applicable to any polyvinyl chloride resin. The term "polyvinyl chloride" as used herein is inclusive of any polymer formed at least in part of the recurring group

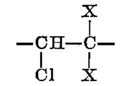

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Patent No. 2,984,593 to Isaksem et al., that is, syndiotactic polyvinyl chloride, as well as atactic and isotactic polyvinyl chlorides.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with convention means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2 - propylene glycol, 1,4 - butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The stabilizer components of the invention including the organotin mercapto acid ester and α- and β-mercapto acid or alcohol, are employed in an amount sufficient to impart the desired resistance to heat deterioration at working temperatures of 350° F. and above. The more rigorous the conditions to which the resin will be subjected during working and mixing, and the longer the term required for resisting degradation, the greater will be the amount of organotin mercapto acid ester required. Generally, as little as 0.25% total of the stabilizer components by weight of the resin, will give resistance to heat deterioration.

There is no critical upper limit on the amount, but amounts above about 10% by weight of the resin do not give an increase in stabilizing effectiveness commensurate with the additional stabilizer employed. Preferably, the amount is from about 0.5 to about 5% by weight of the resin.

The proportion of α- or β-mercapto acid or mercapto alcohol is not critical, and is sufficient to lessen early color deterioration of the resin. The mercapto acid or alcohol is not itself a stabilizer, and when used alone is completely ineffectual. Consequently, it is remarkable that as little as 0.1% of the mercapto acid or alcohol, by weight of the organotin mercapto acid ester, markedly improves resistance to early discoloration. Preferably, for optimum results, the amount of the mercapto acid or mercapto alcohol is from about 0.25% to about 5% by weight of the organotin mercapto acid ester. The proportion of mercapto acid or alcohol can be higher, but in amounts above 15% any additional advantage may not be commensurate with the amount added.

The mercapto acid or alcohol also improves clarity, particualrly when cloudiness-imparting additives are present, such as lubricants and impact modifiers. In this event, more of the mercapto acid or alcohol may be needed.

The stabilizer combination of the invention can be employed together with other polyvinyl chloride resin stabilizers. The stabilizer combination of the invention in this event will be the major stabilizer, and the additional stabilizer will supplement the stabilizing action of the former, the amount of the stabilizer combination being within the range from about 0.25 to about 15 parts by weight per 100 parts of the resin, and the additional stabilizer being in an amount of from about 0.05 to about 10 parts per 100 parts of the resin.

Among the additional metallic stabilizers are included other organotin compounds, polyvalent metal salts of medium and or high molecular weight fatty acids and phenols, with metals such as calcium, tin, cadmium, barium, zinc, magnesium and strontium. The non-metallic stabilizers include phosphites, epoxy compounds, and the like. Epoxy compounds are especially useful, and typical compounds are described in U.S. Patent No. 2,997,454.

Generally, the stabilizer composition of this invention can be prepared by mixing the organotin mercapto acid ester with the mercapto alcohol or mercapto acid, either alone, or with any liquid lubricant or plasticizer to be added to the resin composition with the stabilizer.

The preparation of the polyvinyl chloride resin composition is easily accomplished by conventional procedures. The selected stabilizer combination is formed as above, and then is blended with the polyvinyl chloride resins, or alternatively, the components are blended individually in the resin, using, for instance, a two or three roll mill, at a temperature at which the mix is fluid and thorough blending facilitated, milling the resin composition includng any plasticizer at from 250 to 375° F. for a time sufficient to form a homogeneous mass, five minutes, usually. After the mass is uniform, it is sheeted off in the usual way.

The following examples in the opinion of the inventor represent preferred embodiments of this invention.

EXAMPLES 1 TO 7

A series of rigid or non-plasticized formulations was prepared having the following composition:

| Ingredients: | Parts by weight |
|---|---|
| Polyvinyl chloride homopolymer (Diamond 450) | 150 |
| Mineral oil (lubricant) | 1.5 |
| Dibutyltin bis(isooctyl thioglycollate) / Alpha- or beta-mercapto acid or acohol noted in Table I below | 3.0 |

Six different mercapto acids and alcohols were tested. As controls, dibutyl tin bis(isooctylthioglycollate) and the mercapto acids or alcohols were also used singly, in the same total amount as the combinations (3.0 parts).

The stabilizer components were first mixed together in the proportions indicated in a blender to form a stable homogeneous liquid solution, which was then mixed with the resin on a two-roll mill at 350° F. to form a homogeneous sheet, and sheeted off. Strips were cut off from the sheets and heated in an oven at 375° F. for two hours to determine heat stability. Pieces of each strip were removed at fifteen minute intervals and affixed to cards to shows the progressive heat deterioration. A sample of each composition was pressed for three minutes at 375° F. to obtain a press-polished sheet.

In all cases, the resins containing only mercapto acids and alcohols, and no organotin thioglycollate, turned a dark ochre on the mill, and were therefore not subjected to the heat stability test. The appearance of the other samples is reported in Table I below.

These compounds gave no improvement in resistance to early discoloration, in combination with the dibutyltin diisooctyl thioglycollate. Thus, synergistic improvement

TABLE I

| Example | Control | 1 | 2 | 3 |
|---|---|---|---|---|
| Stabilizer composition | Dibutyltin bis(isooctyl thioglycollate, 3.0 | Dibutyltin bis(isooctyl thioglycollate), 2.97; thiolactic acid, 0.03 | Dibutyltin bis(isooctyl thioglycollate), 2.94; thiolactic acid, 0.06 | Dibutyltin bis(isooctylthio glycollate), 2.97; thiomalic acid, 0.03 |
| Time, minutes | Color | Color | Color | Color |
| Initial (pressed polished sheet). | Colorless | Colorless | Colorless | Colorless. |
| 15 | Light yellow | Very light yellow | Very light yellow | Very light yellow. |
| 30 | do | do | do | Do. |
| 45 | do | Light yellow | Light yellow | Light yellow |
| 60 | Yellow with darkened edges. | Light yellow, darkened edges. | Light yellow with darkened edges. | Light yellow with darkened edges. |
| 75 | do | Yellow darkened edges | Yellow with darkened ed es. | Yellow with darkened edges. |
| 90 | Dark yellow, brown streaks. | Dark yellow, brown streaks. | Dark yellow with slight brown streaks. | Dark yellow with brown streaks. |
| 105 | Brown | Brown | Brown | Brown. |
| 120 | Black | Black | Black | Black. |

| Example | 4 | 5 | 6 | 7 |
|---|---|---|---|---|
| Stabilizer composition | Dibutyltin bis(isooctyl thioglycollate), 2.97; thiosalicylic acid, 0.03 | Dibutyltin bis(isooctyl thioglycollate), 2.91; α-mercapto lauric acid 0.09 | Dibutyltin bis(isooctyl thioglycollate), 2.94; 2-mercapto ethanol, 0.06 | Dibutyltin bis(isooctylthio glycollate), 2.97; β-mercapto propionic acid 0.03 |
| Time, minutes | Color | Color | Color | Color |
| Initial (pressed polished sheet). | Colorless | Colorless | Colorless | Colorless. |
| 15 | Very light yellow | Very light yellow | Very light yellow | Very light yellow. |
| 30 | do | do | do | Do. |
| 45 | Light yellow | Light yellow | Light yellow | Light yellow. |
| 60 | Light yellow, darkened edges. | Light yellow, darkened edges. | Light yellow, darkened edges. | Light yellow, darkened edges. |
| 75 | Yellow, darkened edges | Yellow, darkened edges | Yellow, darkened edges | Yellow, darkened edges. |
| 90 | Dark yellow, brown streaks. | Brownish yellow | Brownish yellow | Dark yellow, brown streaks. |
| 105 | Brown | Brown | Brown | Brown. |
| 120 | Black | Black | Black | Black. |

The results clearly indicate that the α- and β- mercapto acids and mercapto alcohols greatly improve the resistance to early discoloration at 375° F. of polyvinyl chloride resins containing an organotin mercaptocarboxylic acid ester, i.e., dibutyltin bis(isooctyl-thioglycollate) as a heat stabilizer. The difference between light yellow and very light yellow during the first thirty minutes of heating is quite significant, since the material remaining on the rolls or in other processing equipment is small, relative to the batch, and a very small difference in color intensity may spell the difference between a colorless batch and one having a faint discoloration, due to this residual material.

In contrast, ω-mercapto acids other than α- and β-mercapto acids and all mercapto acid esters are ineffective in this respect. Thus, the α and β position of the mercapto group and the free carboxylic acid group each contribute to effectiveness.

The ω-mercapto acid and mercapto acid esters shown in Table II below were mixed with dibutyltin di(isooctyl thioglycollate), and blended with the same resin formulation as in Examples 1 to 7. The resin mixtures were sheeted off, and tested as in Examples 1 to 7, at 375° F.

in resistance to early discoloration of the compositions of Examples 1 to 7 is rather remarkable; moving the mercapto group away from the α and β position destroys the effect, and so does esterification of the acid group.

A further stabilizer composition was prepared, using 1.0 part of thioglycollic acid, and 99.0 parts of dibutyltin diisooctyl thioglycollate. This composition was not homogeneous, and dibutyltin thioglycollate separated out as a precipitate. This of course was what would be expected, from U.S. Patent No. 2,789,963, Example 1. Compositions of dibutyltin dilaurate with 2% thioglycollic, thiolactic and β-mercapto propionic acid were all incompatible and formed precipitates.

Compositions using the resin formulation of Examples 1 to 7, but substituting dibutyltin dilaurate for the dibutyltin diisooctyl thioglycollate, and employing thiolactic acid mercaptoethanol and ω-mercaptobutyric acid as the additional mercapto acid or alcohol component, were mixed into the polyvinyl chloride resin composition. The resin compositions were sheeted off, the sheets cut into strips, and the strips subjected to the heat stability test, at 375° F. The results obained are shown in Table III.

TABLE II

| | A | B | C | D |
|---|---|---|---|---|
| | Stabilizer composition in parts by weight | | | |
| | Dibutyltin bis (isooctyl-thioglycollate) 3.0 | Dibutyltin bis(isooctyl-thioglycollate) 2.94; ω-mercapto butyric acid 0.06 | Dibutyltin bis(isooctyl-thioglycollate) 2.88; Octyl thioglycollate 0.12 | Dibutyltin bis(isooctylthio-glycollate) 2.85; Dioctyl thiomaleate 0.15 |
| Time (minutes) | Color | Color | Color | Color |
| Initial (pressed polished sheet) | Colorless | Colorless | Colorless | Colorless. |
| 15 | Yellow | Yellow | Yellow | Yellow. |
| 30 | do | do | do | Do. |
| 45 | do | do | do | Do. |
| 60 | do | do | do | Do. |
| 75 | Dark yellow, darkened edges. | Dark yellow, darkened edges. | Dark yellow, darkened edges. | Dark yellow, darkened edges. |
| 90 | Brownish-yellow, darkened edges. | Brownish-yellow, darkened edges. | Brownish-yellow, darkened edges. | Brownish-yellow, darkened edges. |
| 105 | Very dark brown | Very dark brown | Very dark brown | Very dark brown. |
| 120 | Black | Black | Black | Black. |

TABLE III

| | I | II | III | IV |
|---|---|---|---|---|
| | Stabilizer composition in parts by weight | | | |
| | Dibutyltin dilaurate, 2.94; Thiolactic acid, 0.06 | Dibutyltin dilaurate, 2.94; Mercaptoethanol, 0.06 | Dibutyltin dilaurate, 2.94; ω-Mercaptobutyric acid, 0.06 | Dibutyltin dilaurate, 3.0 |
| Time (minutes) | Color | Color | Color | Color |
| Initial (pressed polished sheet) | Colorless | Colorless | Pale yellow | Pale yellow. |
| 15 | Dark yellow | Dark yellow | Brown | Medium brown. |
| 30 | Medium brown | Medium brown | Medium brown | Do. |
| 45 | do | do | do | Dark brown with black edges. |
| 60 | Very dark brown | Very dark brown | Very dark brown | Very dark brown. |
| 75 | do | do | do | Do. |

It is evident from the above results that the thiolactic acid, mercaptoethanol and ω-mercaptobutyric acid are each virtually equivalent, and do not impart any significant lessening of discoloration during the first thirty minutes of heating. In fact, at the conclusion of thirty minutes of heating all of the samples are virtually identical, unlike the samples in Examples 1 to 7. The ω-mercaptobutyric acid is substantially without effect, and the slight effect evidenced by the thiolactic acid and mercaptoethanol is apparent only in the first fifteen minutes of heating.

Accordingly, the α- and β-mercapto acids and alcohols employed in accordance with the instant invention are effective with the organotin mercapto acid ester stabilizers, and in this respect differ from other mercapto acids and alcohols, such as the ω-mercapto compounds, but not with other organotin stabilizers such as dibutyltin dilaurate, a typical dialkyl tin dicarboxylate. With these the α-, β- and ω-mercapto compounds have virtually the same ineffectiveness.

EXAMPLES 8 AND 9

Two polyvinyl chloride resin formulations were prepared employing an impact modifier system in combination with polyvinyl chloride resin. The impact modifier used was Blendex acrylonitrile-butadiene-styrene copolymer. This material imparts a distinct haze to the composition.

The formulation prepared was as follows:

| | Parts by weight |
|---|---|
| Diamond 450, polyvinyl chloride resin homopolymer | 150 |
| Wax E, lubricant | 0.37 |
| Blendex 401 | 18 |
| Stabilizer combination shown in Table IV—amount shown in Table IV. | |

The stabilizer combination was blended with the resin formulation on a two-roll mill at 300° F., and worked five minutes, after which the mixture was sheeted off. Strips were cut from the sheet and heated in an oven at 350° F., with samples withdrawn at fifteen minute intervals, cut from the strip and affixed to a card. The results are shown in Table IV.

TABLE IV

| | Control | Example 8 | Example 9 |
|---|---|---|---|
| | Stabilizer composition in parts by weight | | |
| | Dibutyltin diisooctyl thioglycollate, 3.0 | Dibutyltin diisooctyl thioglycollate, 2.97; thiolactic acid, 0.03 | Dibutyltin diisooctyl thioglycollate, 2.85; thiolactic acid, 0.15 |
| Time (minutes) | Color | Color | Color |
| Initial (pressed polished sheet) | Colorless with haze | Colorless with barely detectable haze | Clear and colorless. |
| 15 | Yellow with haze | do | Do. |
| 30 | do | Clear and very faint yellow tint | Do. |
| 45 | do | do | Do. |
| 60 | do | Faint yellow tint | Very faint yellow tint. |
| 75 | Dark yellow with darkened edges | do | Do. |
| 90 | Brownish yellow with darkened edges | do | Do. |
| 105 | Very dark brown | do | Do. |
| 120 | Black | Yellow tint | Faint yellow tint. |

It is evident that the thiolactic acid greatly lessens the initial discoloration during the first thirty minutes of heating and also improves clarity, even in an amount as small as 1% by weight of the dibutyltin diisooctyl thioglycollate. When the amount is increased to 5%, a clear composition is obtained, with a greatly improved resistance to early discoloration, continuing through the first hour of heating.

EXAMPLES 10 AND 11

Polyvinyl chloride resin compositions were prepared according to the following formulation:

| | Parts by weight |
|---|---|
| Diamond 450, polyvinyl chloride resin homopolymer | 150 |
| Mineral oil | 1.5 |
| Stabilizer combination shown in Table V—amount shown in Table V. | |

These compositions were prepared in the manner described in Examples 1 to 7, and tested for heat stability at 350° F. using the same test procedure. The following results were obtained.

TABLE V

| | Control | Example 10 | Example 11 |
|---|---|---|---|
| | Stabilizer composition in parts by weight | | |
| | Dibutyltin diisooctyl thioglycollate, 3.0 | Dibutyltin diisooctyl thioglycollate, 2.94; thiolactic acid, 0.06 | Dibutyltin diisooctyl thioglycollate, 2.85; thiolactic acid, 0.15 |
| Time (minutes) | Color | Color | Color |
| Initial (pressed polished sheet) | Colorless | Colorless | Colorless. |
| 15 | do | do | Do. |
| 30 | First barely noticeable yellow tint | do | Do. |
| 45 | Very faint yellow tint | First barely noticeable yellow tint | Do. |
| 60 | Faint yellow tint | Faint barely noticeable yellow tint | First barely noticeable yellow tint. |
| 75 | do | Faint yellow tint | Barely noticeable yellow tint. |
| 90 | Yellow tint | do | Faint yellow tint. |
| 105 | do | Pale yellow | Do. |
| 120 | do | do | Pale yellow. |

It is evident that the thiolactic acid greatly improved the resistance of the polyvinyl chloride resin to the development of an early yellow discoloration. In fact, in Example 11, the amount of the thiolactic acid was sufficient to prevent development of any discoloration whatsoever through the first forty-five minutes of heating, and even after one and one-half hours of heating, there is only a faint yellow discoloration.

EXAMPLE 12

A polyvinyl chloride resin formulation was prepared with dibutyltin diisooctyl thioglycollate, thiolactic acid is the stabilizer, and calcium stearate as a lubricant. The following formulation was used:

| | Parts by weight |
|---|---|
| Diamond 450, polyvinyl chloride resin homopolymer | 150 |
| Calcium stearate | 1.5 |
| Stabilizer combination noted in Table VI—amount noted in Table VI. | |

TABLE VI

| | Control | Example 12 |
|---|---|---|
| | Stabilizer composition in parts by weight | |
| | Dibutyltin diisooctyl thioglycollate, 3.0 | Dibutyltin diisooctyl thioglycollate, 2.73; thiolactic acid, 0.27 |
| Time (minutes) | Color | Color |
| Initial (pressed polished sheet). | Colorless and cloudy | Clear and colorless. |
| 15 | Pale yellow and cloudy | Do. |
| 30 | Light yellow | Do. |
| 45 | do | Do. |
| 60 | do | Do. |
| 75 | do | First barely detectable yellow tint. |
| 90 | do | Do. |
| 105 | do | Faint yellow tint. |
| 120 | do | Pale yellow tint. |

It is evident that the thiolactic acid not only clears up the cloudiness introduced by the calcium stearate, but also greatly improves the resistance to early discoloration.

Having regard to the foregoing disclosure, the following is claimed as the patentable and inventive embodiments thereof:

1. A polyvinyl chloride resin composition having an enhanced resistance to early discoloration when heated at 350° F. comprising a polyvinyl chloride resin, (a) at least one organotin mercapto acid ester containing two radicals per tin atom selected from the group consisting of alkyl and cycloalkyl groups having from three to about thirty carbon atoms and at least one mercapto carboxylic acid ester group linked to tin through a mercapto sulfur atom and having from three to about sixty carbon atoms, and (b) a mercapto compound selected from the group consisting of α- and β-mercapto carboxylic acids and α- and β-mercapto hydroxy carboxylic acids having from three to thirty carbon atoms, and α- and β-mercapto alcohols having from two to about thirty carbon atoms, having one of the formulae (III)

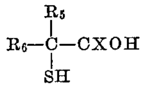

and (IV)

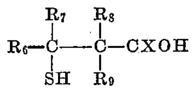

in Formulae III and IV, X is selected from the group consisting of

 and $H_2$ in Formula III: $R_5$ and $R_6$ are selected from the group consisting of hydrogen and organic radicals selected from the group consisting of alkyl, aryl, cycloalkyl, alkenyl, cycloalkenyl, hydroxyalkyl, $—CH_2COOH$,

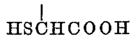

and $—(CH_2)_nCOOH$, wherein *n* is four or five; when one of $R_5$ or $R_6$ is $—(CH_2)_nCOOH$, the other is hydrogen; when one of $R_5$ or $R_6$ is

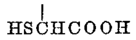

the other is hydrogen; when one of $R_5$ or $R_6$ is hydroxyalkyl, the other is hydrogen; and $R_5$ and $R_6$ can be taken together with

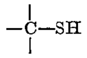

to form a phenyl ring in Formula IV: $R_6$ and $R_7$ are selected from the group consisting of hydrogen and organic radicals selected from the group consisting of alkyl, aryl, cycloalkyl, alkenyl, cycloalkenyl and hydroxyalkyl; when one of $R_6$ or $R_7$ is hydroxyalkyl, the other is hydrogen; $R_8$ and $R_9$ are selected from the group consisting of hydrogen and organic radicals selected from the group consisting of alkyl, aryl, cycloalkyl, alkenyl and cycloalkenyl; $R_6$, $R_7$, $R_8$ and $R_9$ can be taken together with

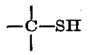

to form a phenyl ring, a naphthyl ring, a cyclohexyl ring or a furfuryl ring;

the mercapto compound being in an amount of from 0.1 percent to about 15 percent by weight of the organotin mercapto acid ester, the organotin mercapto acid ester and mercapto compound together being in an amount from 0.25 to about 10 percent by weight of the resin.

2. A polyvinyl chloride resin composition according to claim 1 wherein the organotin mercapto ester has the formula

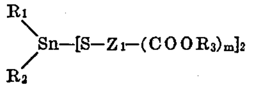

wherein $R_1$ and $R_2$ are alkyl or cycloalkyl groups having from three to about thirty carbon atoms, $Z_1$ is a bivalent organic radical having from one to about thirty carbon atoms, and $R_3$ is an organic group derived from an alcohol having from one to about four hydroxyl groups and from one to thirty carbon atoms, and *m* is an integer from one to four.

3. A polyvinyl chloride resin composition according to claim 1 wherein the mercapto compound is a mercaptocarboxylic acid.

4. A polyvinyl chloride resin composition according to claim 1, wherein the mercapto acid is thiolactic acid.

5. A polyvinyl chloride resin composition according to claim 1, wherein the mercapto acid is β-mercapto propionic acid.

6. A polyvinyl chloride resin composition according to claim 1, wherein the mercapto compound is a mercapto alcohol.

7. A polyvinyl chloride resin composition according to claim 1, wherein the organotin acid ester is a dibutyl tin thioglycollate ester and the mercapto compound is an α-mercapto carboxylic acid.

8. A polyvinyl chloride resin composition according to claim 1, wherein the organotin acid ester is a dibutyl tin thioglycollate ester and the mercapto compound is a β-mercapto carboxylic acid.

9. A homogeneous liquid stabilizer composition for lessening early discoloration of polyvinyl chloride resins due to heating at 350° F., comprising (a) at least one organotin mercapto acid ester containing two radicals per tin atom selected from the group consisting of alkyl and cycloalkyl groups having from three to about thirty carbon atoms and at least one mercapto carboxylic acid ester group linked to tin through a mercapto sulfur atom and having from three to about sixty carbon atoms, and (b) a mercapto compound selected from the group consisting of α- and β-mercapto carboxylic acids and α- and β-mercapto hydroxy carboxylic acids having from three to thirty carbon atoms, and α- and β-mercapto alcohols having from two to about thirty carbon atoms, having one of the formulae (III) 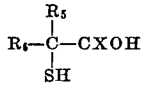

and (IV) 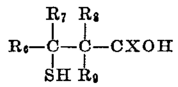

in Formulae III and IV, X is selected from the group consisting of

 and $H_2$ in Formula III: $R_5$ and $R_6$ are selected from the group consisting of hydrogen and organic radicals selected from the group consisting of alkyl, aryl, cycloalkyl, alkenyl, cycloalkenyl, hydroxyalkyl, $—CH_2COOH$,

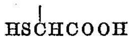

and $—(CH_2)_nCOOH$, wherein *n* is four or five; when one of $R_5$ or $R_6$ is $—(CH_2)_nCOOH$, the other is hydrogen; when one of $R_5$ and $R_6$ is

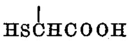

the other is hydrogen; when one of $R_5$ or $R_6$ is hydroxyalkyl, the other is hydrogen; and $R_5$ and $R_6$ can be taken together with

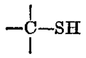

to form a phenyl ring.

in Formula IV: $R_6$ and $R_7$ are selected from the group consisting of hydrogen and organic radicals selected from the group consisting of alkyl, aryl, cycloalkyl, alkenyl, cycloalkenyl and hydroxyalkyl; when one of $R_6$ or $R_7$ is hydroxyalkyl, the other is hydrogen; $R_8$ and $R_9$ are selected from the group consisting of hydrogen and organic radicals selected from the group consisting of alkyl, aryl, cycloalkyl, alkenyl and cycloalkenyl; $R_6$, $R_7$, $R_8$ and $R_9$ can be taken together with

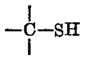

to form a phenyl ring, a naphthyl ring, a cyclohexyl ring or a furfuryl ring;

the mercapto compound being in an amount of from 0.1 percent to about 15 percent by weight of the organotin mercapto acid ester.

10. A stabilizer compositon in accordance with claim 9 wherein the organotin mercapto acid ester has the formula

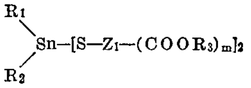

wherein $R_1$ and $R_2$ are alkyl or cycloalkyl groups having from three to about thirty carbon atoms, $Z_1$ is a bivalent organic radical having from one to about thirty carbon atoms, and $R_3$ is an organic group derived from an alcohol having from one to about four hydroxyl groups and from one to thirty carbon atoms, and *m* is an integer from one to four.

11. The stabilizer composition of claim 9 wherein the mercapto compound is a mercapto carboxylic acid.

12. The stabilizer composition of claim 9 wherein the acid is thiolactic acid.

13. The stabilizer composition of claim 3 wherein the acid is β-mercaptopropionic acid.

14. The stabilizer composition of claim 9 wherein the mercapto compound is mercapto alcohol.

15. The stabilizer composition of claim 9 wherein the mercapto compound is present in an amount of from 0.25 to about 5 percent by weight of the organotin mercapto acid ester.

16. A stabilizer composition according to claim 9 wherein the organotin mercapto acid ester is a dibutyl tin thioglycollate ester and the mercapto compound is an α-mercapto carboxylic acid.

17. A stabilizer composition according to claim 9 wherein the organotin mercapto acid ester is a dibutyl tin thioglycollate ester and the mercapto compound is a β-mercapto carboxylic acid.

References Cited

UNITED STATES PATENTS

| | | | |
|---|---|---|---|
| 2,641,596 | 6/1953 | Leistner et al. | 260—45.75 |
| 2,789,102 | 4/1957 | Weinberg | 260—45.75 |
| 2,914,506 | 11/1959 | Mack et al. | 260—45.75 |
| 3,063,963 | 11/1962 | Wooten et al. | 260—45.75 |
| 3,067,166 | 12/1962 | Zaremsky | 260—45.75 |

FOREIGN PATENTS

| | | |
|---|---|---|
| 782,483 | 9/1957 | Great Britain. |
| 874,574 | 8/1961 | Great Britain. |
| 881,578 | 11/1961 | Great Britain. |
| 899,577 | 6/1962 | Great Britain. |

DONALD L. CZAJA, Primary Examiner

V. P. HOKE, Assistant Examiner

U.S. Cl. X.R.

260—45.85, 45.8, 45.95; 252—400

PO-1050
(5/69)

UNITED STATES PATENT OFFICE
CERTIFICATE OF CORRECTION

Patent No. 3,507,827 Dated April 21, 1970

Inventor(s) Mark W. Pollock

It is certified that error appears in the above-identified patent and that said Letters Patent are hereby corrected as shown below:

Column 2, line 44, "2,914,50" should be -- 2,914,506 --;
Column 4, line 36, "mercaptoaxelaic" should be --mercaptoazelaic --;
Column 4, line 45, "acn" should be -- can --;
Column 4, line 53, "isotrodecyl" should be -- isotridecyl --;
Column 4, line 59, "adiene-3-d" should be -- adiene-3-ol --;
Column 4, line 59, "cycloheptene-3-d" should be --cycloheptene-3-ol--;
Column 5, line 7, "marcapto" should be -- mercapto --;
Column 6, line 65, Formula No. 19, formula should read as follows:

--

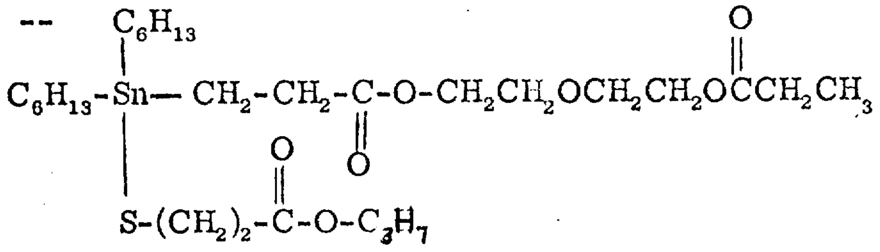

--;

Column 7, line 4, Formula No. 21, " $C_4H_g$ " should read -- $C_4H_9$ --;

Column 7, line 11, Formula No. 22, "$S-CH_2COOCH_2OH_2OH$" should read -- $S-CH_2COOCH_2CH_2OH$ --;
Column 10, line 22, "or" should read -- of --;
Column 10, line 71, "shows" should read -- show --.

SIGNED AND SEALED OCT 6-1970

(SEAL)
Attest:

Edward M. Fletcher, Jr.
Attesting Officer

WILLIAM E. SCHUYLER, JR.
Commissioner of Patents